United States Patent
Imai (10) Patent No.: US 11,508,989 B2
(45) Date of Patent: Nov. 22, 2022

(54) SOLID ELECTROLYTE FILM FOR ALL-SOLID STATE SECONDARY BATTERY, SOLID ELECTROLYTE SHEET FOR ALL-SOLID STATE SECONDARY BATTERY, POSITIVE ELECTRODE ACTIVE MATERIAL FILM FOR ALL-SOLID STATE SECONDARY BATTERY, NEGATIVE ELECTRODE ACTIVE MATERIAL FILM FOR ALL-SOLID STATE SECONDARY BATTERY, ELECTRODE SHEET FOR ALL-SOLID STATE SECONDARY BATTERY, ALL-SOLID STATE SECONDARY BATTERY, AND METHOD FOR MANUFACTURING ALL-SOLID STATE SECONDARY BATTERY

(71) Applicant: FUJIFILM Corporation, Tokyo (JP)

(72) Inventor: Shinji Imai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 280 days.

(21) Appl. No.: 16/561,796

(22) Filed: Sep. 5, 2019

(65) Prior Publication Data

US 2019/0393550 A1 Dec. 26, 2019

Related U.S. Application Data

(63) Continuation of application No. PCT/JP2018/008326, filed on Mar. 5, 2018.

(30) Foreign Application Priority Data

Mar. 7, 2017 (JP) .............................. JP2017-042635

(51) Int. Cl.
*H01M 10/0562* (2010.01)
*H01M 10/0585* (2010.01)
(Continued)

(52) U.S. Cl.
CPC ..... *H01M 10/0562* (2013.01); *H01M 4/0471* (2013.01); *H01M 4/139* (2013.01); *H01M 4/62* (2013.01); *H01M 10/0585* (2013.01); *H01M 2300/0068* (2013.01)

(58) Field of Classification Search
CPC ......... H01M 10/0562; H01M 10/0585; H01M 4/0471; H01M 4/139; H01M 4/62
See application file for complete search history.

(56) References Cited

U.S. PATENT DOCUMENTS

2012/0231345 A1 9/2012 Ogawa et al.
2012/0231348 A1* 9/2012 Ohtomo ............ H01M 10/0562
429/318

FOREIGN PATENT DOCUMENTS

JP 2003-208897 A 7/2003
JP 2003208897 * 7/2003
(Continued)

OTHER PUBLICATIONS

International Search Report dated Apr. 17, 2018 from the International Searching Authority in counterpart International Application No. PCT/JP2018/008326.
(Continued)

*Primary Examiner* — Jayne L Mershon
(74) *Attorney, Agent, or Firm* — Sughrue Mion, PLLC (57) ABSTRACT

Provided are an inorganic solid electrolyte material including a sulfide-based inorganic solid electrolyte and an electron-insulating inorganic material that coats a surface of the sulfide-based inorganic solid electrolyte, is solid at 100° C., and fuses at a specific temperature, a slurry using the same, a solid electrolyte film for an all-solid state secondary battery, a solid electrolyte sheet for an all-solid state secondary battery, a positive electrode active material film for an all-solid state secondary battery, a negative electrode active material film for an all-solid state secondary battery, (Continued)

an electrode sheet for an all-solid state secondary battery, an all-solid state secondary battery, and a method for manufacturing an all-solid state secondary battery.

2 Claims, 1 Drawing Sheet

(51) Int. Cl.
*H01M 4/139* (2010.01)
*H01M 4/04* (2006.01)
*H01M 4/62* (2006.01)

(56) References Cited

FOREIGN PATENT DOCUMENTS

| | | |
|---|---|---|
| JP | 2009-117168 A | 5/2009 |
| JP | 2010-033732 A | 2/2010 |
| JP | 2010-186682 A | 8/2010 |
| JP | 2011-113720 A | 6/2011 |
| JP | 2012-094437 A | 5/2012 |
| JP | 2013-143297 A | 7/2013 |
| WO | 2011/010552 A1 | 1/2011 |

OTHER PUBLICATIONS

Written Opinion dated Apr. 17, 2018 from the International Bureau in counterpart International Application No. PCT/JP2018/008326.
International Preliminary Report on Patentability dated Sep. 10, 2019 from the International Bureau in counterpart International Application No. PCT/JP2018/008326.

* cited by examiner

SOLID ELECTROLYTE FILM FOR ALL-SOLID STATE SECONDARY BATTERY, SOLID ELECTROLYTE SHEET FOR ALL-SOLID STATE SECONDARY BATTERY, POSITIVE ELECTRODE ACTIVE MATERIAL FILM FOR ALL-SOLID STATE SECONDARY BATTERY, NEGATIVE ELECTRODE ACTIVE MATERIAL FILM FOR ALL-SOLID STATE SECONDARY BATTERY, ELECTRODE SHEET FOR ALL-SOLID STATE SECONDARY BATTERY, ALL-SOLID STATE SECONDARY BATTERY, AND METHOD FOR MANUFACTURING ALL-SOLID STATE SECONDARY BATTERY

CROSS-REFERENCE TO RELATED APPLICATIONS

This application is a Continuation of PCT International Application No. PCT/JP2018/008326 filed on Mar. 5, 2018, which claims priority under 35 U.S.C. § 119 (a) to Japanese Patent Application No. 2017-042635 filed in Japan on Mar. 7, 2017. Each of the above applications is hereby expressly incorporated by reference, in its entirety, into the present application.

BACKGROUND OF THE INVENTION

1. Field of the Invention

The present invention relates to an inorganic solid electrolyte material, a slurry using the same, a solid electrolyte film for an all-solid state secondary battery, a solid electrolyte sheet for an all-solid state secondary battery, a positive electrode active material film for an all-solid state secondary battery, a negative electrode active material film for an all-solid state secondary battery, an electrode sheet for an all-solid state secondary battery, an all-solid state secondary battery, and a method for manufacturing an all-solid state secondary battery.

2. Description of the Related Art

A lithium ion secondary battery is a storage battery which has a negative electrode, a positive electrode and an electrolyte sandwiched between the positive electrode and the negative electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in reliability and safety.

Under the above-described circumstances, development of all-solid state secondary batteries in which a non-flammable inorganic solid electrolyte is used instead of the organic electrolytic solution is underway. In all-solid state secondary batteries, all of the negative electrode, the electrolyte, and the positive electrode are solid, safety and reliability which are considered as a problem of batteries in which the organic electrolytic solution is used can be significantly improved, and it also becomes possible to extend service lives.

As inorganic solid electrolytes that are used in all-solid state secondary batteries, sulfide-based inorganic solid electrolytes are known. Sulfide-based inorganic solid electrolytes have an excellent ion conduction property, but are highly reactive to moisture, hydrogen, and the like and easily deteriorate. In addition, in a case in which a sulfide-based inorganic solid electrolyte comes into contact with moisture, a harmful hydrogen sulfide is generated. Therefore, in a step of transporting sulfide-based inorganic solid electrolytes, a step of forming a film using a sulfide-based inorganic solid electrolyte, and the like, there is a desire for the development of techniques that suppress the deterioration of sulfide-based inorganic solid electrolytes and enable stable handling.

In order to achieve the above-described object, JP2010-033732A describes that, in a case in which the surface of a sulfide-based inorganic solid electrolyte is coated with a fluorine-containing silane compound or a fluorine-containing acrylic resin, the deterioration of the sulfide-based inorganic solid electrolyte is suppressed even in the case of handling the sulfide-based inorganic solid electrolyte in the ordinary atmosphere.

SUMMARY OF THE INVENTION

However, in the technique described in JP2010-033732A, a fluorine-containing silane compound or a fluorine-containing acrylic resin is present on the surface of the sulfide-based inorganic solid electrolyte, and thus the interface resistance between solid electrolyte particles significantly increases. Therefore, it is difficult to form solid electrolyte layers exhibiting a desired excellent ion conductivity.

An object of the present invention is to provide an inorganic solid electrolyte material that is capable of effectively preventing the deterioration of a sulfide-based inorganic solid electrolyte by the contact between the sulfide-based inorganic solid electrolyte and moisture or the like in the atmosphere and enables the formation of films exhibiting a sufficient ion conduction property. In addition, another object of the present invention is to provide a slurry, a solid electrolyte film for an all-solid state secondary battery, a solid electrolyte sheet for an all-solid state secondary battery, a positive electrode active material film for an all-solid state secondary battery, a negative electrode active material film for an all-solid state secondary battery, an electrode sheet for an all-solid state secondary battery, an all-solid state secondary battery, and a method for manufacturing an all-solid state secondary battery, in which the inorganic solid electrolyte material is used.

As a result of repeating intensive studies in consideration of the above-described objects, the present inventors found that, in a case in which the surface of a sulfide-based inorganic solid electrolyte is coated with an electron-insulating inorganic material that is solid at 100° C. and thermally fuses in a temperature range of 200° C. or lower, it is possible to effectively prevent the contact between the sulfide-based inorganic solid electrolyte and moisture or the like in the atmosphere and sufficiently suppress the deterioration of the sulfide-based inorganic solid electrolyte. In addition, it was found that, in a case in which a film is formed using this surface-coated sulfide-based inorganic solid electrolyte and an electron-insulating inorganic material that is a substance that coats the solid electrolyte is thermally fused, it is possible to remove an excess coating substance (electron-insulating inorganic material) into voids between solid electrolyte particles through the capillary action and the formation of a film having an excellent ion conduction property becomes possible.

The present invention was completed after additional studies were repeated on the basis of the above-described finding.

That is, the above-described objects are achieved by the following means.

[1] An inorganic solid electrolyte material comprising: a sulfide-based inorganic solid electrolyte; and an electron-insulating inorganic material that coats a surface of the sulfide-based inorganic solid electrolyte, is solid at 100° C., and thermally fuses in a temperature range of 200° C. or lower.

[2] The inorganic solid electrolyte material according to [1], in which the electron-insulating inorganic material is sulfur and/or modified sulfur.

[3] A slurry comprising: the inorganic solid electrolyte material according to [1] or [2]; and a dispersion medium.

[4] The slum/according to [3], further comprising: an organic binder.

[5] A solid electrolyte film for an all-solid state secondary battery, in which the inorganic solid electrolyte material according to [1] or [2] is used.

[6] The solid electrolyte film for an all-solid state secondary battery according to [5], further comprising: an organic binder.

[7] A solid electrolyte sheet for an all-solid state secondary battery comprising: a base material; and the solid electrolyte film for an all-solid state secondary battery according to [5] or [6] disposed on the base material.

[8] A positive electrode active material film for an all-solid state secondary battery, in which a positive electrode active material and the inorganic solid electrolyte material according to [1] or [2] are used.

[9] The positive electrode active material film for an all-solid state secondary battery according to [8], further comprising: an organic binder.

[10] A negative electrode active material film for an all-solid state secondary battery comprising: a negative electrode active material; and the inorganic solid electrolyte material according to [1] or [2].

[11] The negative electrode active material film for an all-solid state secondary battery according to [10], further comprising: an organic binder.

[12] An electrode sheet for an all-solid state secondary battery comprising: a base material; and the positive electrode active material film for an all-solid state secondary battery according to [8] or [9] or the negative electrode active material film for an all-solid state secondary battery according to [10] or [11] disposed on the base material.

[13] An all-solid state secondary battery comprising: the solid electrolyte film for an all-solid state secondary battery according to [5] or [6] as a solid electrolyte layer.

[14] An all-solid state secondary battery comprising: the positive electrode active material film for an all-solid state secondary battery according to [8] or [9] as a positive electrode active material layer.

[15] An all-solid state secondary battery comprising: the negative electrode active material film for an all-solid state secondary battery according to [10] or [11] as a negative electrode active material layer.

[16] A method for manufacturing an all-solid state secondary battery, comprising: heating a film formed using the inorganic solid electrolyte material according to [1] or [2] to thermally fuse the electron-insulating inorganic material in the film; and then cooling the film to produce a solid electrolyte layer.

[17] A method for manufacturing an all-solid state secondary battery, comprising: heating a film formed using a positive electrode active material and the inorganic solid electrolyte material according to [1] or [2] to thermally fuse the electron-insulating inorganic material in the film; and then cooling the film to produce a positive electrode active material layer.

[18] A method for manufacturing an all-solid state secondary battery, comprising: heating a film formed using a negative electrode active material and the inorganic solid electrolyte material according to [I] or [2] to thermally fuse the electron-insulating inorganic material in the film; and then cooling the film to produce a negative electrode active material layer.

In the present specification, numerical ranges expressed using "to" include numerical values before and after "to" as the lower limit value and the upper limit value.

The inorganic solid electrolyte material of an embodiment of the present invention and the slurry in which the same is used enable the formation of a film in which the contact between the sulfide-based inorganic solid electrolyte and moisture or the like in the atmosphere is effectively suppressed and thus the sulfide-based inorganic solid electrolyte does not easily deteriorate and which exhibits a sufficient ion conduction property.

The solid electrolyte film for an all-solid state secondary battery, the positive electrode active material film for an all-solid state secondary battery, and the negative electrode active material film for an all-solid state secondary battery of an embodiment of the present invention effectively suppress the deterioration of inorganic solid electrolytes caused by the influence of moisture and the like during the formation of the films and the like and have an excellent ion conductivity.

The solid electrolyte sheet for an all-solid state secondary battery of an embodiment of the present invention effectively suppresses the deterioration of inorganic solid electrolytes caused by the influence of moisture and the like during the formation of the sheet and the like and has an excellent ion conductivity of the solid electrolyte film.

The electrode sheet for an all-solid state secondary battery of an embodiment of the present invention effectively suppresses the deterioration of inorganic solid electrolytes caused by the influence of moisture and the like during the formation of the sheet and the like and has the positive electrode active material film or the negative electrode active material film that is excellent in terms of the ion conduction property.

The all-solid state secondary battery of an embodiment of the present invention effectively suppresses the deterioration of inorganic solid electrolytes caused by the influence of moisture and the like during the formation of the solid electrolyte layer, the positive electrode active material layer and/or the negative electrode active material layer and the like and has the solid electrolyte layer and/or the active material layer that are excellent in terms of the ion conduction property.

According to the method for manufacturing an all-solid state secondary battery of an embodiment of the present invention, it is possible to effectively suppress the deterioration of inorganic solid electrolytes caused by the influence of moisture and the like during the formation of the solid electrolyte layer, the positive electrode active material layer and/or the negative electrode active material layer and the like. In addition, according to the method for manufacturing an all-solid state secondary battery of the embodiment of the present invention, it is possible to obtain all-solid state secondary batteries having the solid electrolyte layer, the positive electrode active material layer, and/or the negative electrode active material layer that are excellent in terms of the ion conduction property.

DESCRIPTION OF THE PREFERRED EMBODIMENTS

A preferred embodiment of the present invention will be described below.

[Inorganic Solid Electrolyte Material]

An inorganic solid electrolyte material of an embodiment of the present invention includes a sulfide-based inorganic solid electrolyte; and an electron-insulating inorganic material that coats a surface of the sulfide-based inorganic solid electrolyte, is solid at 100° C., and thermally fuses in a temperature range of 200° C. or lower. The sulfide-based inorganic solid electrolyte is likely to react with moisture or the like and thus deteriorate; however, in the inorganic solid electrolyte material of the embodiment of the present invention, the surface of the sulfide-based inorganic solid electrolyte is coated with the electron-insulating inorganic material, and thus the sulfide-based inorganic solid electrolyte is effectively blocked from moisture and the like. Therefore, in the transportation of the sulfide-based inorganic solid electrolyte, a step of manufacturing all-solid state secondary batteries, and the like, the necessity for using a dry room or the like having an ultralow dew point is reduced, and it becomes possible to reduce transportation costs, manufacturing costs, and the like.

<Sulfide-Based Inorganic Solid Electrolyte>

The sulfide-based inorganic solid electrolyte is preferably an inorganic solid electrolyte which contains sulfur atoms (S), has an ion conductivity of a metal belonging to Group I or II of the periodic table, and has an electron-insulating property. The sulfide-based inorganic solid electrolyte is preferably an inorganic solid electrolyte which, as elements, contains at least Li, S, or P and has a lithium ion conductivity, but the sulfide-based inorganic solid electrolyte may also include elements other than Li, S, and P depending on the purposes or cases.

Examples thereof include lithium ion-conductive inorganic solid electrolytes satisfying a composition represented by Formula (I).

$$L_{a1}M_{b1}P_{c1}S_{d1}A_{e1} \qquad \text{Formula (I)}$$

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the respective elements, and a1:b1:c1:d1:e1 satisfies 1 to 12:0 to 5:1:2 to 12:0 to 10. Furthermore, a1 is preferably 1 to 9 and more preferably 1.5 to 7.5. b1 is preferably 0 to 3. Furthermore, d1 is preferably 2.5 to 10 and more preferably 3.0 to 8.5. Furthermore, e1 is preferably 0 to 5 and more preferably 0 to 3.

The compositional ratios among the respective elements can be controlled by adjusting the amounts of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolyte can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolyte, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS_2$—LiCl, $Li_2S$—$P_2S_5$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_1$, $Li_2S$—$Al_2S_3$, $Li_2S$—$SiS_2$—$Al_2S_3$, $Li_2S$—$SiS_2$—$P_2S_5$, $Li_7S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Mixing ratios of the respective raw materials do not matter. Examples of a method for synthesizing sulfide-based inorganic solid electrolyte materials using the above-described raw material compositions include an amorphorization method. Examples of the amorphorization method include a mechanical milling method, a solution method, and a melting quenching method. This is because treatments at normal temperature become possible, and it is possible to simplify manufacturing steps.

The particle diameter (volume-average particle diameter) of the sulfide-based inorganic solid electrolyte is not particularly limited, but is preferably 0.01 μm or more and more preferably 0.1 μm or more. The upper limit is preferably 100 μm or less and more preferably 50 μm or less. Meanwhile, the average particle diameter of the sulfide-based inorganic solid electrolyte particles is measured in the following order. The sulfide-based inorganic solid electrolyte particles are diluted and adjusted to a 1% by mass dispersion liquid in a 20 ml sample bottle using heptane. The diluted dispersed specimen was irradiated with 1 kHz ultrasonic waves for 10 minutes and then immediately used for testing. Data are scanned 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis-Dynamic light scattering" is referred to. Five specimens are produced per level, and the average value thereof is employed.

<Electron-Insulating Inorganic Material>

The electron-insulating inorganic material that is used in the present invention is an inorganic material that is solid at 100° C. (that is, the melting point exceeds 100° C.) and thermally fuses in a temperature range of 200° C. or lower. The expression "the electron-insulating inorganic material thermally fuses in a temperature range of 200° C. or lower" means that the electron-insulating inorganic material thermally fuses in a temperature range of 200° C. or lower at 1 atmosphere. Here, the expression "electron-insulating" refers to a property of preventing the passage of electrons. "An electron-insulating inorganic material" mentioned in the present invention is preferably an inorganic material having a conductivity of $10^{-9}$ S/cm or less at a measurement temperature of 25° C.

As the above-described electron-insulating inorganic material, for example, sulfur, modified sulfur, iodine, mixtures of sulfur and iodine, and the like can be exemplified, and sulfur and/or modified sulfur can be preferably used as the electron-insulating inorganic material.

The sulfur refers to a sulfur single body (not only sulfur itself but also sulfur present in a multimeric complex form). In addition, the modified sulfur is obtained by kneading sulfur and a modifier. For example, pure sulfur and an olefin-based compound that is a modification additive are kneaded together, whereby modified sulfur in which some of sulfur is modified to a sulfur polymer can be obtained. Meanwhile, the modified sulfur is capable of including an organic polymer; however, in the present invention, "modified sulfur" is included in an organic material.

(Coating with Electron-Insulating Inorganic Material)

In the inorganic solid electrolyte material of the embodiment of the present invention, the surface of the sulfide-based inorganic solid electrolyte is coated with the electron-insulating inorganic material. In the present invention, "coating" means that part or all of the surface of the sulfide-based inorganic solid electrolyte is coated. Here, the sulfide-based inorganic solid electrolyte is generally particulate, and thus "coating" means that part or all of each of the particles of the sulfide-based inorganic solid electrolyte is coated.

A method for coating the surface of the sulfide-based inorganic solid electrolyte with the electron-insulating inorganic material is not particularly limited, and it is possible to employ, for example, a method in which the sulfide-based inorganic solid electrolyte and the electron-insulating inorganic material are crushed and mixed together using a mortar, a ball mill, a sand mill, an oscillatory ball mill, a satellite ball mill, a planetary ball mill, a swirling airflow-type jet mill, or the like and the electron-insulating inorganic material that has been made to be finely particulate is physically attached to the surfaces of the sulfide-based inorganic solid electrolyte particles, a method in which the electron-insulating inorganic material that has been made to be finely particulate or the electron-insulating inorganic material in a thermally fused state is sprayed to the sulfide-based inorganic solid electrolyte particles and the electron-insulating inorganic material is attached to the surfaces of the sulfide-based inorganic solid electrolyte particles, a method in which the sulfide-based inorganic solid electrolyte particles are immersed in the electron-insulating inorganic material in a thermally fused state, or the like. The method in which the sulfide-based inorganic solid electrolyte particles are immersed in the electron-insulating inorganic material in a thermally fused state is preferred in consideration of coatability.

The electron-insulating inorganic material thermally fuses at a relatively low temperature of 200° C. or lower, and thus the electron-insulating inorganic material can be moved into voids in a film through the capillary action by heating the film to a certain extent after the formation of the film using the inorganic solid electrolyte material of the embodiment of the present invention. As a result, an excess electron-insulating inorganic material can be removed from the surfaces of the electrolyte that forms the film, and it becomes possible to decrease the interface resistance of a film to be obtained and improve the ion conductivity.

[Slurry]

A slurry of an embodiment of the present invention contains at least the above-described inorganic solid electrolyte material of the embodiment of the present invention and a dispersion medium described below. The slurry of the embodiment of the present invention also preferably contains an organic binder described below. In addition, the slurry of the embodiment of the present invention may contain a positive electrode active material and/or a negative electrode active material described below. In a case in which the slurry of the embodiment of the present invention is applied and dried to remove the dispersion medium, thereby forming a film, and, as necessary, the film is heated to thermally fuse the electron-insulating inorganic material, it is possible to form at least any film of a solid electrolyte film (layer), a positive electrode active material film (layer), or a negative electrode active material film (layer) that is used in all-solid state secondary batteries.

That is, in a case in which the slurry of the embodiment of the present invention includes neither a positive electrode active material nor a negative electrode active material, the slurry of the embodiment of the present invention can be preferably used to form solid electrolyte films that are used in all-solid state secondary batteries. In addition, in a case in which the slurry of the embodiment of the present invention includes a positive electrode active material but does not include a negative electrode active material, the slurry of the embodiment of the present invention can be preferably used to form positive electrode active material films that are used in all-solid state secondary batteries. In addition, in a case in which the slurry of the embodiment of the present invention includes a negative electrode active material but does not include a positive electrode active material, the slurry of the embodiment of the present invention can be preferably used to form negative electrode active material films that are used in all-solid state secondary batteries. Meanwhile, the slum/ including a positive electrode active material and/or a negative electrode active material may be used to form solid electrolyte films that are used in all-solid state secondary batteries, but solid electrolyte films, generally, include neither a positive electrode active material nor a negative electrode active material.

In a case in which the slurry of the embodiment of the present invention includes neither a positive electrode active material nor a negative electrode active material, the content of the inorganic solid electrolyte material of the embodiment of the present invention in the total solid contents of the slurry of the embodiment of the present invention is preferably 50% to 90% by mass and more preferably 70% to 85% by mass.

In addition, in a case in which the slurry of the embodiment of the present invention includes a positive electrode active material and the inorganic solid electrolyte material, the total content of the positive electrode active material and the inorganic solid electrolyte material in the total solid contents of the slurry of the embodiment of the present invention is preferably 70% to 98% by mass and more preferably 80% to 95% by mass.

In addition, in a case in which the slurry of the embodiment of the present invention includes a negative electrode active material and the inorganic solid electrolyte material, the total content of the negative electrode active material and the inorganic solid electrolyte material in the total solid contents of the slurry of the embodiment of the present invention is preferably 65% to 95% by mass and more preferably 75% to 95% by mass.

<Dispersion Medium>

The dispersion medium that is included in the slurry of the embodiment of the present invention is not particularly limited as long as the dispersion medium is capable of dispersing or dissolving the respective components in the slurry, and it is possible to use, for example, an ether compound solvent, an amide compound solvent, a ketone compound solvent, an aromatic compound solvent, an aliphatic compound solvent, and a nitrile compound solvent.

As the ether compound solvent, for example, alkylene glycol alkyl ethers (preferably ethylene glycol diethyl ether (diethoxyethane)), ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol dimethyl ether, dipropylene glycol monomethyl ether, tripropylene glycol monomethyl ether, diethylene glycol monobutyl ether, diethylene glycol dibutyl ether, and the like), dialkyl ethers (dimethyl ether, diethyl ether, dibutyl ether, and the like), alkyl aryl ether (anisole), tetrahydrofuran, tetrahydropyran, dioxane (including each of 1,2-, 1,3-, and 1,4-isomers), and dioxolane are exemplified.

As the amide compound solvent, for example, N,N-dimethylformamide, 1-methyl-2-pyrrolidone, 2-pyrrolidinone, 1,3-dimethyl-2-imidazolidinone, 2-pyrrolidinone, ε-caprolactam, formamide, N-methylformamide, acetamide, N-methylacetamide, N,N-dimethylacetamide, N-methylpropanamide, and hexamethylphosphoric triamide are exemplified.

As the ketone compound solvent, for example, acetone, methyl ethyl ketone, and cyclohexanone are exemplified.

As the aromatic compound solvent, for example, benzene, toluene, xylene, and mesitylene are exemplified.

As the aliphatic compound solvent, for example, hexane, heptane, cyclohexane, methylcyclohexane, octane, pentane, cyclopentane, cyclooctane, and the like are exemplified.

As the nitrile compound solvent, for example, acetonitrile, propionitrile, and butyronitrile are exemplified.

The boiling point of the dispersion medium at a normal pressure (1 atmosphere) is preferably 50° C. or higher and more preferably 70° C. or higher. The upper limit is preferably 250° C. or lower and more preferably 220° C. or lower. The dispersion medium may be used singly or two or more dispersion media may be used in combination.

Among them, the slurry of the embodiment of the present invention preferably contains, as the dispersion medium, the ether compound solvent and/or the aliphatic compound solvent and more preferably contains the ether compound solvent. The ether compound solvent is preferably dibutyl ether, diethoxyethane, and/or dioxane. The aliphatic compound solvent is preferably heptane, octane, and/or cyclooctane.

The content of the dispersion medium in the slurry of the embodiment of the present invention is not particularly limited, but is preferably 20% to 80% by mass, more preferably 30% to 70% by mass, and particularly preferably 40% to 60% by mass.

The dispersion medium may be used singly or two or more dispersion media may be used in combination.

<Organic Binder>

In a case in which the slurry of the embodiment of the present invention contains an organic binder, as this organic binder, organic polymers are exemplified. For example, fluorine-containing resins, hydrocarbon-based thermoplastic resins, and/or acrylic resins can be preferably used.

Examples of fluorine-containing resins include polytetrafluoroethylene (PTFE), polyvinylene difluoride (PVdF), and copolymers of polyvinylene difluoride and hexafluoropropylene (PVdF-HFP).

Examples of hydrocarbon-based thermoplastic resins include polyethylene, polypropylene, styrene butadiene rubber (SBR), hydrogenated styrene butadiene rubber (HSBR), butylene rubber, acrylonitrile butadiene rubber, polybutadiene, polyisoprene, polyisoprene latex, and the like.

Examples of acrylic resins include a variety of (meth) acrylic monomers, (meth)acrylic amide monomers, and copolymers of monomers constituting these resins (preferably copolymers of acrylic acid and methyl acrylate).

In addition, copolymers of an acrylic resin and a vinyl-based monomer are also preferably used. Examples thereof include copolymers of methyl (meth)acrylate and styrene, copolymers of methyl (meth)acrylate and acrylonitrile, and copolymers of butyl (meth)acrylate, acrylonitrile, and styrene. In the specification of the present application, a copolymer may be any one of a statistic copolymer, a periodic copolymer, a blocked copolymer, and a graft copolymer, and a blocked copolymer is preferred.

In addition, as the organic binder, it is possible to preferably use a polyurethane resin, a polyurea resin, a polyamide resin, a polyimide resin, a polyester resin, a polyether resin, a polycarbonate resin, a cellulose derivative resin, or the like.

The organic binder may be used singly or two or more organic binders may be used in combination.

The organic binder is preferably at least one selected from the group consisting of an acrylic resin, a polyurethane resin, a polyurea resin, a polyimide resin, a fluorine-containing resin, which are described above, and a hydrocarbon-based thermoplastic resin from the viewpoint of exhibiting a strong bonding property (the suppression of peeling from a collector and the improvement of the cycle service life by the bonding of a solid interface).

The organic binder preferably has a polar group in order to enhance the wettability or adsorption property to particle surfaces. The polar group is preferably a monovalent group including a hetero atom, for example, a monovalent group including a structure in which any of an oxygen atom, a nitrogen atom, or a sulfur atom and a hydrogen atom bond to each other, and specific examples thereof include a carboxy group, a hydroxy group, an amino group, a phosphoric acid group, and a sulfo group.

The organic binder is also preferably particulate. In a case in which the organic binder is particulate, the average particle diameter is, generally, preferably 10 nm to 30 μm and more preferably 10 to 1,000 nm.

The weight-average molecular weight (Mw) of the organic binder is preferably 10,000 or more, more preferably 20,000 or more, and still more preferably 30,000 or more. The upper limit is preferably 1,000,000 or less, more preferably 200,000 or less, and still more preferably 100,000 or less.

The content of the organic binder is preferably 0% to 8% by mass, more preferably 0.5% to 6% by mass, and still more preferably 1% to 3% by mass of the total solid contents of the slurry of the embodiment of the present invention.

The slurry of the embodiment of the present invention also preferably includes a lithium salt, a conductive auxiliary agent, a dispersant, or the like.

<Positive Electrode Active Material>

A positive electrode active material that the slurry of the embodiment of the invention may contain is preferably a positive electrode active material capable of reversibly intercalating and deintercalating lithium ions. The above-described material is not particularly limited as long as the material has the above-described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$(LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

In the present invention, LCO, LMO, NCA, or NMC is more preferred.

The shape of the positive electrode active material is not particularly limited, but is preferably a particle shape. The volume-average particle diameter (circle-equivalent average particle diameter) of positive electrode active material particles is not particularly limited. For example, the volume-average particle diameter can be set to 0.1 to 50 µm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The positive electrode active material may be used singly or two or more positive electrode active materials may be used in combination.

In the case of forming a positive electrode active material layer, the mass (mg) of the positive electrode active material per unit area (cm$^2$) of the positive electrode active material layer (weight per unit area) is not particularly limited and can be appropriately determined depending on the set battery capacity.

The content of the positive electrode active material in the slurry is not particularly limited, but is preferably 10% to 95% by mass, more preferably 30% to 90% by mass, still more preferably 50% to 85% by mass, and particularly preferably 55% to 80% by mass with respect to a solid content of 100% by mass.

<Negative Electrode Active Material>

A negative electrode active material that the slurry of the embodiment of the invention may contain is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide, silicon oxide, metal complex oxides, a lithium single body, lithium alloys such as lithium aluminum alloys, metals capable of forming alloys with lithium such as Sn, Si, Al, and In and the like. Among these, carbonaceous materials or metal complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially consisting of carbon. Examples thereof include petroleum pitch, carbon black such as acetylene black (AB), graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and deintercalation of lithium ions is small, and thus the high-speed charging and discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of absorbing a larger number of Li ions than a carbon negative electrode (graphite, acetylene black, or the like). That is, the amount of Li ions absorbed per unit mass increases. Therefore, it is possible to increase the battery capacity. As a result, there is an advantage that the battery drying duration can be extended.

The shape of the negative electrode active material is not particularly limited, but is preferably a particle shape. The particle diameter (volume-average particle diameter) of the negative electrode active material is preferably 0.1 μm to 60 μm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method from the mass difference of powder before and after firing as a convenient method.

The negative electrode active material may be used singly or two or more negative electrode active materials may be used in combination.

In the case of forming a negative electrode active material layer, the mass (mg) of the negative electrode active material per unit area ($cm^2$) in the negative electrode active material layer (weight per unit area) is not particularly limited and can be appropriately determined depending on the set battery capacity.

The content of the negative electrode active material in the slurry is not particularly limited, but is preferably 10% to 80% by mass and more preferably 20% to 80% by mass of the solid content of the slurry.

The slurry of the embodiment of the present invention may also contain, for example, alumina, silica, zeolite, boron nitride, or the like.

A surface treatment may be carried out on the surface of an electrode including the positive electrode active material or the negative electrode active material using sulfur or phosphorous.

In addition, the particle surfaces of the positive electrode active material or the negative electrode active material may be treated with an active light ray or an active gas (plasma or the like) before or after the coating of the surfaces.

[Solid Electrolyte Film for all-Solid State Secondary Battery]

A solid electrolyte film for an all-solid state secondary battery of an embodiment of the present invention (hereinafter, simply referred to as "the electrolyte film of the embodiment of the present invention") is a film formed using the inorganic solid electrolyte material of the embodiment of the present invention and is preferably obtained by drying a film formed using the above-described slurry of the embodiment of the present invention. The electrolyte film of the embodiment of the present invention is more preferably formed by thermally fusing and then cooling the electron-insulating inorganic material that coats the surface of the sulfide-based inorganic solid electrolyte after the formation of the film. Due to this thermal fusion step, it is possible to migrate the electron-insulating inorganic material into voids between the sulfide-based inorganic solid electrolyte particles through the capillary action, and thus it is possible to remove the excess electron-insulating inorganic material present on the surface of the sulfide-based inorganic solid electrolyte. As a result, the distance between the sulfide-based inorganic solid electrolyte particles decreases from the viewpoint of the entire film, the interface resistance decreases, and the ion conduction property can be improved.

In addition, after the thermal fusion step, pores in the film are sufficiently filled with the electron-insulating inorganic material, and thus there is also an advantage that, even in a case in which an all-solid state secondary battery having this electrolyte film as a solid electrolyte layer is broken, the intrusion of moisture into the solid electrolyte layer can be effectively prevented and it becomes possible to suppress the generation rate of hydrogen sulfide. In addition, pores in the film are sufficiently filled with the electron-insulating inorganic material, and thus it also becomes possible to block dendrites that grow from the negative electrode toward the positive electrode due to the charging and discharging of the all-solid state secondary battery, and it also becomes possible to decrease the risk of internal short-circuit.

The electrolyte film of the embodiment of the present invention is preferably used as a solid electrolyte layer in an all-solid state secondary battery.

The electrolyte film of the embodiment of the present invention preferably contains an organic binder. The organic binder is identical to the organic binder exemplified in the description of the slurry of the embodiment of the present invention. The electrolyte film of the embodiment of the present invention may also contain a positive electrode active material and/or a negative electrode active material; however, generally, the electrolyte film contains neither a positive electrode active material nor a negative electrode active material.

In the electrolyte film of the embodiment of the present invention, the content of the inorganic solid electrolyte material of the embodiment of the present invention is preferably 50% to 98% by mass, more preferably 60% to 95% by mass, and still more preferably 70% to 90% by mass.

In the electrolyte film of the embodiment of the present invention, the content of the organic binder is preferably 0% to 8% by mass, more preferably 0.5% to 6% by mass, and still more preferably 1% to 3% by mass.

The electrolyte film of the embodiment of the present invention may contain, as components other than the inorganic solid electrolyte material and the inorganic binder, for example, a positive electrode active material, a negative electrode active material, alumina, silica, zeolite, boron nitride, or the like.

A preferred film thickness of the electrolyte film of the embodiment of the present invention is identical to a layer thickness of a solid electrolyte layer in an all-solid state secondary battery described below.

A method for forming the electrolyte film of the embodiment of the present invention will be described below.

[Positive Electrode Active Material Film for all-Solid State Secondary Battery]

A positive electrode active material film for an all-solid state secondary battery of an embodiment of the present invention (hereinafter, simply referred to as "the positive electrode active material film of the embodiment of the present invention") is a film formed using the inorganic solid electrolyte material of the embodiment of the present invention and is preferably obtained by drying a film formed using the above-described slurry of the embodiment of the present invention (containing a positive electrode active material, but not containing a negative electrode active material). The positive electrode active material film of the embodiment of the present invention is more preferably formed by thermally fusing and then cooling the electron-insulating inorganic material that coats the surface of the sulfide-based inorganic solid electrolyte after the formation of the film. Due to this thermal fusion step, it is possible to migrate the electron-insulating inorganic material into voids between the solid electrolyte particles, between the positive electrode active material particles, or between the sulfide-based inorganic solid electrolyte particles and the positive electrode active material through the capillary action, and thus it is possible to remove the excess electron-insulating inorganic material present on the surface of the sulfide-based inorganic solid electrolyte. As a result, it is possible to decrease the interface resistance, and the ion conduction property improves.

In addition, after the thermal fusion step, pores in the film are sufficiently filled with the electron-insulating inorganic material, and thus there is also an advantage that, even in a case in which an all-solid state secondary battery having this positive electrode active material film as a positive electrode active material layer is broken, the intrusion of moisture into the positive electrode active material layer can be effectively prevented and it becomes possible to suppress the generation rate of hydrogen sulfide.

The positive electrode active material film of the embodiment of the present invention is preferably used as a positive electrode active material layer in an all-solid state secondary battery.

The positive electrode active material film of the embodiment of the present invention preferably contains an organic binder. The organic binder is identical to the organic binder exemplified in the description of the slurry of the embodiment of the present invention.

In the positive electrode active material film of the embodiment of the present invention, the content of the inorganic solid electrolyte material of the embodiment of the present invention is preferably 10% to 40% by mass and more preferably 15% to 30% by mass.

In the positive electrode active material film of the embodiment of the present invention, the content of the positive electrode active material is preferably 50% to 90% by mass, more preferably 55% to 80% by mass, and still more preferably 60% to 80% by mass.

In the positive electrode active material film of the embodiment of the present invention, the content of the organic binder is preferably 0% to 8% by mass, more preferably 0.5% to 6% by mass, and still more preferably 1% to 3% by mass.

The positive electrode active material film of the embodiment of the present invention may contain, for example, alumina, silica, zeolite, boron nitride, or the like.

A preferred film thickness of the positive electrode active material film of the embodiment of the present invention is identical to a layer thickness of a positive electrode active material layer in the all-solid state secondary battery described below.

A method for forming the positive electrode active material film of the embodiment of the present invention will be described below.

[Negative Electrode Active Material Film for all-Solid State Secondary Battery]

A negative electrode active material film for an all-solid state secondary battery of an embodiment of the present invention (hereinafter, simply referred to as "the negative electrode active material film of the embodiment of the present invention") is a film formed using the inorganic solid electrolyte material of the embodiment of the present invention and is preferably obtained by drying a film formed using the above-described slurry of the embodiment of the present invention (containing a negative electrode active material, but not containing a positive electrode active material). The negative electrode active material film of the embodiment of the present invention is more preferably formed by thermally fusing and then cooling the electron-insulating inorganic material that coats the surface of the sulfide-based inorganic solid electrolyte after the formation of the film. Due to this thermal fusion step, it is possible to migrate the electron-insulating inorganic material into voids between the solid electrolyte particles, between the negative electrode active material particles, or between the sulfide-based inorganic solid electrolyte particles and the negative electrode active material through the capillary action, and thus it is possible to remove the excess electron-insulating inorganic material present on the surface of the sulfide-based inorganic solid electrolyte. As a result, it is possible to decrease the interface resistance, and the ion conduction property improves.

In addition, after the thermal fusion step, pores in the film are sufficiently filled with the electron-insulating inorganic material, and thus there is also an advantage that, even in a case in which an all-solid state secondary battery having this negative electrode active material film as a negative electrode active material layer is broken, the intrusion of moisture into the negative electrode active material layer can be effectively prevented and it becomes possible to suppress the generation rate of hydrogen sulfide.

The negative electrode active material film of the embodiment of the present invention is preferably used as a negative electrode active material layer in an all-solid state secondary battery.

The negative electrode active material film of the embodiment of the present invention preferably contains an organic binder. The organic binder is identical to the organic binder exemplified in the description of the slurry of the embodiment of the present invention.

In the negative electrode active material film of the embodiment of the present invention, the content of the inorganic solid electrolyte material of the embodiment of the present invention is preferably 10% to 60% by mass, more preferably 15% to 50% by mass, still more preferably 15% to 45% by mass, and most preferably 20% to 40% by mass.

In the negative electrode active material film of the embodiment of the present invention, the content of the negative electrode active material is preferably 35% to 95% by mass, more preferably 38% to 92% by mass, still more preferably 50% to 90% by mass, still more preferably 50% to 83% by mass, still more preferably 55% to 88% by mass, and still more preferably 60% to 80% by mass.

In the negative electrode active material film of the embodiment of the present invention, the content of the organic binder is preferably 0% to 8% by mass, more preferably 0.5% to 6% by mass, and still more preferably 1% to 3% by mass.

The negative electrode active material film of the embodiment of the present invention may contain, for example, alumina, silica, zeolite, boron nitride, or the like.

A preferred film thickness of the negative electrode active material film of the embodiment of the present invention is identical to a layer thickness of a negative electrode active material layer in the all-solid state secondary battery described below.

A method for forming the negative electrode active material film of the embodiment of the present invention will be described below.

The electrolyte film, the positive electrode active material film, and the negative electrode active material film of the embodiment of the present invention also preferably includes a lithium salt, a conductive auxiliary agent, a dispersant, or the like.

[Methods for Forming Films]

In the present invention, methods for forming the solid electrolyte film (layer), the positive electrode active material film (layer), and the negative electrode active material film (layer) are not particularly limited, and ordinary methods can be appropriately selected. For example, application (preferably wet-type application), spray application, spin coat application, dip coating, slit application, stripe application, and bar coating application are exemplified.

After application, generally, a drying treatment is carried out. In addition, the drying treatment may be carried out after multiple layers are formed by application. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In the case of heating the slurry in the above-described temperature range, it is possible to remove the dispersion medium and put the slurry into a solid state. In addition, the temperature is not excessively high, and individual members of an all-solid state secondary battery are not damaged, which is preferable. Therefore, in the all-solid state secondary battery, excellent general performance is exhibited, and a favorable bonding property can be obtained.

The formed solid electrolyte film (layer), positive electrode active material film (layer), and negative electrode active material film (layer) are preferably pressurized. As a pressurization method, a hydraulic pressure cylinder press machine and the like are exemplified. The pressurization force is not particularly limited, however, is generally preferably in a range of 50 to 1,500 MPa. In addition, the films (layers) may be pressurized and heated at the same time. The heating temperature is not particularly limited; however, is generally in a range of 30° C. to 300° C. It is also possible to press the films (layers) at a temperature that is higher than the glass transition temperature of the sulfide-based inorganic solid electrolyte.

The pressurization may be carried out in a state in which the applied solvent or the dispersion medium has been dried in advance or may be carried out in a state in which the solvent or the dispersion medium remains.

The atmosphere during the pressurization is not particularly limited and may be any of the atmosphere, the dried air (dew point: −20° C. or lower), an inert gas (for example, argon gas, helium gas, or nitrogen gas), or the like.

Regarding the pressurization time, a high pressure may be applied for a short period of time (for example, for several hours or shorter) or an intermediate pressure may be applied for a long period of time (one day or longer).

In the present invention, steps of forming the films (layers) preferably include a step of thermally fusing the electron-insulating inorganic material as described above. In the case of adjusting the drying temperature or drying the formed films and heating the films at a temperature that is equal to or higher than the thermal fusion temperature of the electron-insulating inorganic material, it is possible to thermally fuse the electron-insulating inorganic material and migrate an excess electron-insulating inorganic material into pores in the films (layers) through the capillary action.

In the present invention, a heating temperature for the thermal fusion is preferably 200° C. or lower.

[Solid Electrolyte Sheet for all-Solid State Secondary Battery and Electrode Sheet for all-Solid State Secondary Battery]

A solid electrolyte sheet for an all-solid state secondary battery of an embodiment of the present invention (hereinafter, simply referred to as "the electrolyte sheet of the embodiment of the present invention") has a base material and the above-described electrolyte film of the embodiment of the present invention disposed on the base material.

In addition, an electrode sheet for an all-solid state secondary battery of an embodiment of the present invention (hereinafter, simply referred to as "the electrode sheet of the embodiment of the present invention") has a base material and the above-described positive electrode active material film for an all-solid state secondary battery of the embodiment of the present invention or the above-described negative electrode active material film for an all-solid state secondary battery of the embodiment of the present invention disposed on the base material. As a method for forming the solid electrolyte film, the positive electrode active material film, or the negative electrode active material film on the base material, the above-described method for forming the films can be employed.

The base material is not particularly limited as long as the base material is capable of supporting the solid electrolyte film, the positive electrode active material film, or the negative electrode active material film, and examples thereof include sheet bodies (plate-like bodies) of materials, organic materials, inorganic materials, and the like that are described in the section of the collector described below. Examples of the organic materials include a variety of polymers and the like, and specific examples thereof include polyethylene terephthalate, polypropylene, polyethylene, cellulose, and the like. Examples of the inorganic materials include glass, ceramic, and the like.

The solid electrolyte sheet for an all-solid state secondary battery of the embodiment of the present invention can be used as a material that is used to manufacture all-solid state secondary batteries. That is, the solid electrolyte film that is obtained by peeling the base material from the sheet can be used as a solid electrolyte layer of an all-solid state secondary battery.

The electrode sheet of the embodiment of the present invention can be used as a material that is used to manufacture all-solid state secondary batteries. That is, the positive electrode active material film that is obtained by peeling the base material from the sheet can be used as a positive electrode active material layer of an all-solid state secondary battery, and, the negative electrode active material film that is obtained by peeling the base material from the sheet can be used as a negative electrode active material layer of an all-solid state secondary battery. In addition, in the case of using a collector material as the base material, the electrode sheet of the embodiment of the present invention can be used as a laminate structure of a positive electrode collector and a positive electrode active material layer or a laminate structure of a negative electrode collector and a negative electrode active material layer of an all-solid state secondary battery.

[all-Solid State Secondary Battery]

An all-solid state secondary battery of an embodiment of the present invention is not particularly limited in the form as long as the all-solid state secondary battery has the solid electrolyte film of the embodiment of the present invention, the positive electrode active material of the embodiment of the present invention, and/or the negative electrode active material of the embodiment of the present invention (that is, has at least one of the solid electrolyte film of the embodiment of the present invention, the positive electrode active material of the embodiment of the present invention, or the negative electrode active material of the embodiment of the present invention).

Figure 1:
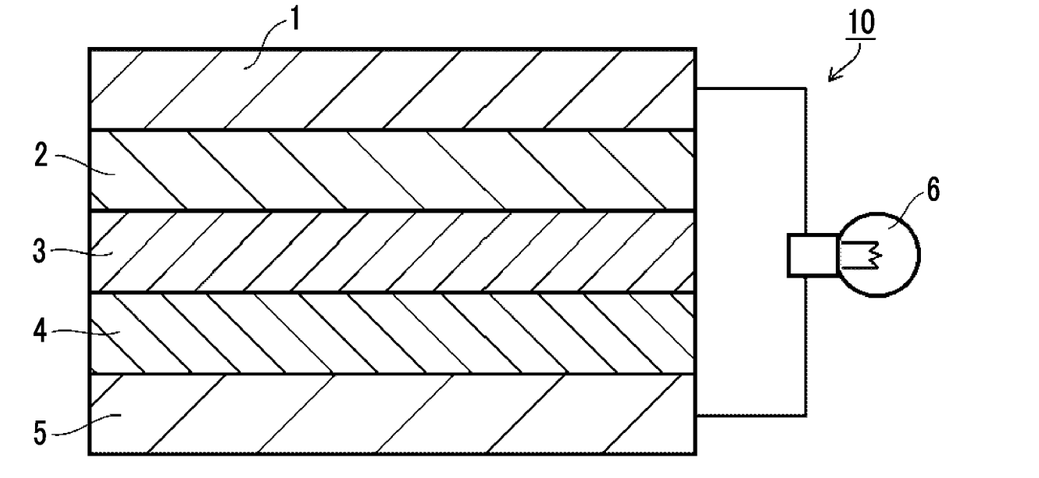
FIG. 1 is a vertical cross-sectional view schematically illustrating a basic structure of an all-solid state secondary battery according to a preferred embodiment of the present invention.

FIG. 1 is a cross-sectional view schematically illustrating a laminated state of the respective layers that constitute the battery regarding an embodiment of the all-solid state secondary battery of the embodiment of the present invention. An all-solid state secondary battery 10 of the present embodiment has a structure formed by laminating a negative electrode collector 1, a negative electrode active material layer 2, a solid electrolyte layer 3, a positive electrode active material layer 4, and a positive electrode collector 5 in this order from the negative electrode side, and adjacent layers are in direct contact with each other. In the case of employing the above-described structure, during charging, electrons ($e^-$) are supplied to the negative electrode side, and, at the same time, an alkali metal or an alkali earth metal that constitutes a positive electrode active material is ionized, passes (is conducted) through the solid electrolyte layer 3 and migrates, and is accumulated in a negative electrode. For example, in the case of a lithium ion secondary battery, lithium ions ($Li^+$) are accumulated in the negative electrode.

On the other hand, during discharging, the alkali metal ions or alkali earth metal ions accumulated in the negative electrode return to the positive electrode side and are capable of supplying electrons to an operation portion 6. In the example of the all-solid state secondary battery illustrated in the drawing, an electric bulb is employed as the operation portion 6, and this is lit by discharging.

In the all-solid state secondary battery of the embodiment of the present invention, the thicknesses of the positive electrode active material layer, the solid electrolyte layer, and the negative electrode active material layer are not particularly limited. In the case of taking the dimensions of ordinary batteries into account, the thicknesses of the respective layers are preferably 10 to 1,000 μm and more preferably 20 μm or more and less than 500 μm.

<Collector (Metal Foil)>

The positive electrode collector 5 and the negative electrode collector 1 are preferably an electron conductor.

In the present specification, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum and an aluminum alloy are more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 μm. In addition, the surface of the collector is preferably provided with protrusions and recesses by means of a surface treatment.

In the all-solid state secondary battery of the embodiment of the present invention, a functional layer, member, or the like may be appropriately interposed or disposed between the respective layers of the negative electrode collector, the negative electrode active material layer, the solid electrolyte layer, the positive electrode active material layer, and the positive electrode collector or on the outside thereof. In addition, the respective layers may be composed of a single layer or multiple layers.

[Method for Manufacturing all-Solid State Secondary Battery]

A preferred method for manufacturing the all-solid state secondary battery of the embodiment of the present invention will be described.

<Manufacturing of all-Solid State Secondary Battery in which Inorganic Solid Electrolyte Material of Embodiment of Invention is Used for Solid Electrolyte Layer>

A composition including a component that constitutes the positive electrode active material layer is applied onto the base material (for example, a metal foil that serves as the collector) to form the positive electrode active material layer, thereby producing a positive electrode sheet for an all-solid state secondary battery. Next, a composition containing at least the inorganic solid electrolyte material of the embodiment of the present invention (preferably the slurry of the embodiment of the present invention containing neither a positive electrode active material nor a negative electrode active material) is applied onto the positive electrode active material layer to form a layer. Next, this layer is heated to a temperature at which the electron-insulating inorganic material that coats the sulfide-based inorganic solid electrolyte thermally fuses, and a thermally-fused substance of the electron-insulating inorganic material is caused to intrude into pores in the layer through the capillary action. After that, the layer is cooled, whereby the solid electrolyte layer can be formed.

After cooling, a composition containing a component that forms the negative electrode active material layer is applied as a material for a negative electrode onto the solid electrolyte layer so as to form the negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming the respective layers in a reverse order so as to form the negative electrode active material layer, the solid electrolyte layer, and the positive electrode active material layer on the negative electrode collector and overlaying the positive electrode collector thereon. In addition, it is also possible to obtain the all-solid state secondary battery of the embodiment of the present invention by preparing a laminate having a bilayer structure including the base material and the negative electrode active material layer and a laminate having a three-layer structure including the base material, the positive electrode active material layer, and the solid electrolyte layer and overlaying these laminates together. In addition, it is also possible to obtain the all-solid state secondary battery of the embodiment of the present invention by preparing a laminate having a bilayer structure including the base material and the positive electrode active material layer and a laminate having a three-layer structure including the base material, the negative electrode active material layer, and the solid electrolyte layer and overlaying these laminates together.

In the formation of the solid electrolyte layer, in the above-described example, the heating for fusing the electron-insulating inorganic material is carried out immediately after the formation of the layer. However, the present invention is not limited to this embodiment. That is, the layer may be heated in any phase of a step of manufacturing the all-solid state secondary battery as long as the heating is carried out after the formation of the layer. In addition, it is also possible to form the layer (coating step) at a temperature that is equal to or higher than the thermal fusion temperature of the electron-insulating inorganic material, and it is also possible to carry out the drying step in the formation of the layer at a temperature that is equal to or higher than the thermal fusion temperature. In these cases, it is not necessary to provide the heating step for thermally fusing the electron-insulating inorganic material separately.

That is, a preferred embodiment of the method for manufacturing an all-solid state secondary battery in which the inorganic solid electrolyte material of the embodiment of the present invention is used for the solid electrolyte layer includes the production of the solid electrolyte layer by heating a film formed using the inorganic solid electrolyte material of the embodiment of the present invention to thermally fuse the electron-insulating inorganic material that coats the sulfide-based inorganic solid electrolyte in the film and then cooling the film.

<Manufacturing of all-Solid State Secondary Battery in which Inorganic Solid Electrolyte Material of Embodiment of Invention is Used for Positive Electrode Active Material Layer>

A composition including at least a positive electrode active material and the inorganic solid electrolyte material of the embodiment of the present invention (preferably the slurry of the embodiment of the present invention containing the positive electrode active material) is applied onto the base material (for example, a metal foil that serves as the collector) to form the positive electrode active material layer. Next, this layer is heated to a temperature at which the electron-insulating inorganic material that coats the sulfide-based inorganic solid electrolyte thermally fuses, and a thermally-fused substance of the electron-insulating inorganic material is caused to intrude into pores in the layer through the capillary action. After that, the layer is cooled, thereby producing the positive electrode sheet for an all-solid state secondary battery.

Next, a composition containing a component that forms the solid electrolyte layer is applied onto the positive electrode active material layer so as to form the solid electrolyte layer. A composition containing a component that forms the negative electrode active material layer is applied as a material for a negative electrode onto the solid electrolyte layer so as to form the negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming the respective layers in a reverse order so as to form the negative electrode active material layer, the solid electrolyte layer, and the positive electrode active material layer on the negative electrode collector and overlaying the positive electrode collector thereon. In addition, it is also possible to obtain the all-solid state secondary battery of the embodiment of the present invention by preparing a laminate having a bilayer structure including the base material and the negative electrode active material layer and a laminate having a three-layer structure including the base material, the positive electrode active material layer, and the solid electrolyte layer and overlaying these laminates together. In addition, it is also possible to obtain the all-solid state secondary battery of the embodiment of the present invention by preparing a laminate having a bilayer structure including the base material and the positive electrode active material layer and a laminate having a three-layer structure including the base material, the negative electrode active material layer, and the solid electrolyte layer and overlaying these laminates together.

In the formation of the positive electrode active material layer, in the above-described example, the heating for fusing the electron-insulating inorganic material is carried out immediately after the formation of the layer. However, the present invention is not limited to this embodiment. That is, the layer may be heated in any phase of a step of manufacturing the all-solid state secondary battery as long as the heating is carried out after the formation of the layer. In addition, it is also possible to form the layer (coating step) at a temperature that is equal to or higher than the thermal fusion temperature of the electron-insulating inorganic material, and it is also possible to carry out the drying step in the formation of the layer at a temperature that is equal to or higher than the thermal fusion temperature. In these cases, it is not necessary to provide the heating step for thermally fusing the electron-insulating inorganic material separately.

That is, a preferred embodiment of the method for manufacturing an all-solid state secondary battery in which the inorganic solid electrolyte material of the embodiment of the present invention is used for the positive electrode active material layer includes the production of the positive electrode active material layer by heating a film formed using the positive electrode active material and the inorganic solid electrolyte material of the embodiment of the present invention to thermally fuse the electron-insulating inorganic material that coats the sulfide-based inorganic solid electrolyte in the film and then cooling the film.

<Manufacturing of all-Solid State Secondary Battery in which Inorganic Solid Electrolyte Material of Embodiment of Invention is Used for Negative Electrode Active Material Layer>

A composition containing a component that constitutes the positive electrode active material layer is applied onto the base material (for example, a metal foil that serves as the collector) to form the positive electrode active material layer.

Next, a composition containing a component that forms the solid electrolyte layer is applied onto the positive electrode active material layer so as to form the solid electrolyte layer.

A composition including at least a negative electrode active material and the inorganic solid electrolyte material of the embodiment of the present invention (preferably the slurry of the embodiment of the present invention containing the negative electrode active material) is applied onto the solid electrolyte layer to form the negative electrode active material layer. Next, this layer is heated to a temperature at which the electron-insulating inorganic material that coats the sulfide-based inorganic solid electrolyte thermally fuses, and a thermally-fused substance of the electron-insulating inorganic material is caused to intrude into pores in the layer through the capillary action. After that, the layer is cooled, thereby producing the negative electrode active material layer.

A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming the respective layers in a reverse order so as to form the negative electrode active material layer, the solid electrolyte layer, and the positive electrode active material layer on the negative electrode collector and overlaying the positive electrode collector thereon. In addition, it is also possible to obtain the all-solid state secondary battery of the embodiment of the present invention by preparing a laminate having a bilayer structure including the base material and the negative electrode active material layer and a laminate having a three-layer structure including the base material, the positive electrode active material layer, and the solid electrolyte layer and overlaying these laminates together. In addition, it is also possible to obtain the all-solid state secondary battery of the embodiment of the present invention by preparing a laminate having a bilayer structure including the base material and the positive electrode active material layer and a laminate having a three-layer structure including the base material, the negative electrode active material layer, and the solid electrolyte layer and overlaying these laminates together.

In the formation of the negative electrode active material layer, in the above-described example, the heating for fusing the electron-insulating inorganic material is carried out immediately after the formation of the layer. However, the present invention is not limited to this embodiment. That is, the layer may be heated in any phase of a step of manufacturing the all-solid state secondary battery as long as the heating is carried out after the formation of the layer. In addition, it is also possible to form the layer (coating step) at a temperature that is equal to or higher than the thermal fusion temperature of the electron-insulating inorganic material, and it is also possible to carry out the drying step in the formation of the layer at a temperature that is equal to or higher than the thermal fusion temperature. In these cases, it is not necessary to provide the heating step for thermally fusing the electron-insulating inorganic material separately.

That is, a preferred embodiment of the method for manufacturing an all-solid state secondary battery in which the inorganic solid electrolyte material of the embodiment of the present invention is used for the negative electrode active material layer includes the production of the negative electrode active material layer by heating a film formed using the negative electrode active material and the inorganic solid electrolyte material of the embodiment of the present invention to thermally fuse the electron-insulating inorganic material that coats the sulfide-based inorganic solid electrolyte in the film and then cooling the film.

The description of the above-described manufacturing methods is about a form in which the inorganic solid electrolyte material of the embodiment of the present invention is used mainly for any one layer of the positive electrode active material layer, the solid electrolyte layer, or the negative electrode active material layer, but the all-solid state secondary battery of the embodiment of the present invention or the method for manufacturing the same are not limited to these forms.

That is, the method for manufacturing an all-solid state secondary battery of the embodiment of the present invention may have two or more of the following steps (a) to (c).

(a) A step of "producing the solid electrolyte layer by heating a film formed using the inorganic solid electrolyte material of the embodiment of the present invention to thermally fuse the electron-insulating inorganic material that coats the sulfide-based inorganic solid electrolyte in the film and then cooling the film"

(b) A step of "producing the positive electrode active material layer by heating a film formed using the positive electrode active material and the inorganic solid electrolyte material of the embodiment of the present invention to thermally fuse the electron-insulating inorganic material that coats the sulfide-based inorganic solid electrolyte in the film and then cooling the film"

(c) A step of "producing the negative electrode active material layer by heating a film formed using the negative electrode active material and the inorganic solid electrolyte material of the embodiment of the present invention to thermally fuse the electron-insulating inorganic material that coats the sulfide-based inorganic solid electrolyte in the film and then cooling the film"

In the formation of the respective layers of the solid electrolyte layer, the positive electrode active material layer, and the negative electrode active material layer, the heating steps that thermally fuse the electron-insulating inorganic material may be combined to one step. That is, the electron-insulating inorganic materials in the respective layers of the solid electrolyte layer, the positive electrode active material layer, and the negative electrode active material layer can be thermally fused with a single heating step.

<Initialization>

The all-solid state secondary battery manufactured as described above is preferably initialized after the manufacturing or before the use. A method for the initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery of the embodiment of the invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, backup power supplies, memory cards, and the like. Additionally, examples of consumer usages include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

Among them, the all-solid state secondary battery of the embodiment of the invention is preferably applied to applications demanding a high capacity and high-rate discharging characteristics. For example, in electricity storage facilities and the like that are expected to have a large capacity in the future, high-level stability becomes essential, and, furthermore, the additional satisfaction of battery performance is demanded. In addition, applications in which a high-capacity secondary battery is mounted and which are charged every day at home such as electric vehicles are imagined. The present invention can be preferably adapted to such usage forms and exhibit the excellent effect.

EXAMPLES

The present invention will be described in more detail on the basis of examples, but the present invention is not limited to these embodiments.

[Reference Example 1] Synthesis of Sulfide-Based Inorganic Solid Electrolyte

In a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, injected into an agate mortar. The molar ratio between $Li_2S$ and $P_2S_5$ is set to 75:25. The components were mixed on an agate mortar using an agate muddler for five minutes.

Sixty six zirconia beads having a diameter of 5 mm were injected into a 45 mL zirconia container (manufactured by Fritsch Japan Co., Ltd.), the full amount of the mixture was injected thereinto, and the container was completely sealed in an argon atmosphere. The container was set in a planetary ball mill P-7 manufactured by Fritsch Japan Co., Ltd., mechanical milling was carried out at 25° C. and a rotation speed of 510 rpm for 20 hours, thereby obtaining yellow powder (6.20 g) of a sulfide-based inorganic solid electrolyte (Li/P/S glass, hereinafter, also referred to as "LPS"). The volume-average particle diameter of the obtained LPS was measured using a laser diffraction/scattering-type particle size distribution measurement instrument LA-920 (trade name, manufactured by Horiba Ltd.) and found out to be 8 μm.

[Preparation Example 1] Preparation of Inorganic Solid Electrolyte Material (Surface-Coated Inorganic Solid Electrolyte)

<Coating by Thermal Fusion and Immersion>

A mortar covered with an aluminum foil was placed on a hot plate heated to 170° C., sulfur (6.20 g) was injected thereinto, and the sulfur was thermally fused.

The sulfide-based inorganic solid electrolyte synthesized in Reference Example 1 (6.20 g) was injected into the molten sulfur and kneaded using a heated muddler for two hours.

After that, the sulfur was cooled to solidify, thereby obtaining a surface-coated inorganic solid electrolyte.

[Test Example 1] Stability Test

<Production of Solid Electrolyte Sheet>

The sulfide-based inorganic solid electrolyte synthesized in Reference Example 1 was left to stand in an atmosphere of 25° C. and a relative humidity of 10% (atmosphere having a dew point of −9° C.) for two minutes. After that, the sulfide-based inorganic solid electrolyte was mixed with a toluene solvent (10 ml) and sufficiently stirred by carrying out a vibration treatment for one hour using a commercially available vibration exciter. The obtained dispersion liquid was applied onto a stainless steel foil using a bar coater and dried at 80° C. for 10 minutes, thereby obtaining a solid electrolyte sheet. After that, the stainless steel foil was brought into contact with the upper portion of a solid electrolyte layer, and the stainless steel foil and the solid electrolyte layer were sandwiched using a commercially available hot press machine and pressurized and heated at 120 MPa and 150° C. for 30 minutes, thereby thermally fusing sulfur that was a surface coating material. After that, the stainless steel foil and the solid electrolyte layer were cooled, thereby obtaining a solid electrolyte sheet 1 (film thickness: 150 μm).

Meanwhile, the operation after the leaving the inorganic solid electrolyte to stand in an atmosphere of 25° C. and a relative humidity of 10% (atmosphere having a dew point of −9° C.) for two minutes was carried out in a dry room having a dew point of −40° C.

<Production of Solid Electrolyte Sheet for Comparison>

The inorganic solid electrolyte obtained in the same manner as in Reference Example 1 was left to stand in an atmosphere of 25° C. and a relative humidity of 10% (atmosphere having a dew point of −9° C.) for two minutes. After that, the inorganic solid electrolyte was mixed with a toluene solvent (10 ml) and sufficiently stirred by carrying out a vibration treatment for one hour using a commercially available vibration exciter. The obtained dispersion liquid was applied onto a stainless steel foil using a bar coater and dried at 80° C. for 10 minutes, then, the stainless steel foil was brought into contact with the upper portion of a solid electrolyte layer, the stainless steel foil and the solid electrolyte layer were sandwiched using a commercially available hot press machine and pressurized at 120 MPa and room temperature for 30 minutes, thereby obtaining a solid electrolyte sheet for comparison 1 (film thickness: 150 Lm).

Meanwhile, the operation after the leaving the inorganic solid electrolyte to stand in an atmosphere of 25° C. and a relative humidity of 10% (atmosphere having a dew point of −9° C.) for two minutes was carried out in a dry room having a dew point of −40° C.

<Evaluation of Ion Conduction Property>

The following cell for ion conductivity measurement was produced in a dry room having a dew point of −40° C., and the ion conductivity was obtained.

—Production of Cell and Evaluation of Ion Conduction Property—

A disc-shaped piece having a diameter of 14.5 mm was cut out from each of the solid electrolyte sheets produced above and put into a stainless steel 2032-type coin case by combining a spacer and a washer together. A confining pressure (screw swaging pressure: 8 N) was applied thereto from the outside of the coin case, thereby producing a cell for ion conductivity measurement.

The ion conductivity was measured using each of the cells for ion conductivity measurement obtained above. Specifically, the voltage magnitude was set to 5 mV using a 1255B FREQUENCY RESPONSE ANALYZER (trade name) manufactured by Solartron Analytical. Inc. in a constant-temperature tank (30° C.), and the alternating current impedance was measured at frequencies of 1 MHz to 1 Hz. Therefore, the resistance of a specimen in the film thickness direction was obtained, and the ion conductivity was obtained by the following calculation expression. The results are shown in the following table.

Ion conductivity($mS/cm$)=1,000'specimen film thickness($cm$)/[resistance($\Omega$)×specimen area($cm^2$)]

TABLE 1

| | Exposure conditions | Ion conduction property |
|---|---|---|
| Solid electrolyte sheet 1 | 25° C., 10% RH, for two minutes (atmosphere having dew point of −9° C.) | $4.0 \times 10^{-4}$ S/cm |
| Solid electrolyte sheet for comparison 1 | | $6.2 \times 10^{-7}$ S/cm |

As shown in Table 1, in a case in which the sulfide-based inorganic solid electrolyte was exposed to the atmosphere of 25° C. and a relative humidity of 10%, the results was that the sulfide-based inorganic solid electrolyte deteriorated and the ion conduction property of the sheet formed using this electrolyte was significantly poor (solid electrolyte sheet for comparison 1).

In contrast, it was found that, in a case in which the sulfide-based inorganic solid electrolyte was coated with the electron-insulating inorganic material that is regulated in the present invention, even after being exposed to the atmosphere of 25° C. and a relative humidity of 10%, the sulfide-based inorganic solid electrolyte did not easily deteriorate and the sheet formed using this electrolyte was excellent in terms of the ion conduction property (solid electrolyte sheet 1).

[Test Example 2] Influence of Surface Coating Material on Ion Conduction Property <Production of Solid Electrolyte Sheet>

A solid electrolyte sheet was obtained by carrying out the following operation in a dry room having a dew point of −40° C.

The surface-coated inorganic solid electrolyte obtained in the same manner as in Preparation Example 1 was mixed with a toluene solvent (10 ml) and sufficiently stirred by carrying out a vibration treatment for one hour using a commercially available vibration exciter. The obtained dispersion liquid was applied onto a stainless steel foil using a bar coater and dried at 80° C. for 10 minutes, thereby obtaining a solid electrolyte sheet. After that, the stainless steel foil was brought into contact with the upper portion of a solid electrolyte layer, and the stainless steel foil and the solid electrolyte layer were sandwiched using a commercially available hot press machine and pressurized and heated at 160 MPa and 150° C. for 30 minutes, thereby thermally fusing sulfur that was a surface coating material. After that, the stainless steel foil and the solid electrolyte layer were cooled, and the stainless steel foil on the upper portion was removed, thereby obtaining a solid electrolyte sheet 2 (film thickness: 150 &Lm).

<Production of Solid Electrolyte Sheet for Comparison>

A solid electrolyte sheet was obtained by carrying out the following operation in a dry room having a dew point of −40° C.

The inorganic solid electrolyte obtained in the same manner as in Reference Example 1 was mixed with a toluene solvent (10 ml) and sufficiently stirred by carrying out a vibration treatment for one hour using a commercially available vibration exciter. The obtained dispersion liquid was applied onto a stainless steel foil using a bar coater and dried at 80° C. for 10 minutes, thereby obtaining a solid electrolyte sheet. After that, the stainless steel foil was brought into contact with the upper portion of a solid electrolyte layer, and the stainless steel foil and the solid electrolyte layer were sandwiched using a commercially available hot press machine and pressurized at 160 MPa for 30 minutes, thereby thermally fusing sulfur that was a surface coating material. After that, the stainless steel foil on the upper portion was removed, thereby obtaining a solid electrolyte sheet for comparison 2 (film thickness: 150 μm).

<Evaluation of Ion Conduction Property>

The stainless steel foil was brought into contact with the upper portion of the obtained solid electrolyte sheet again, a cell for ion conductivity measurement was produced in the same manner as described in the above-described section "<evaluation of ion conduction property>", and the ion conductivity was obtained.

The results are shown in the following table.

TABLE 2

|  | Exposure conditions | Ion conduction property |
|---|---|---|
| Solid electrolyte sheet 2 | Dew point: −40° C. | $6.1 \times 10^{-4}$ S/cm |
| Solid electrolyte sheet for comparison 2 | Dew point: −40° C. | $6.5 \times 10^{-4}$ S/cm |

As shown in Table 2, it is found that, even in a case in which the sulfide-based inorganic solid electrolyte is coated with the electron-insulating inorganic material that is regulated in the present invention, the same ion conductivity as in a case in which the sulfide-based inorganic solid electrolyte is not coated with the electron-insulating inorganic material is exhibited. These results show that the coating with the electron-insulating inorganic material does not substantially affect the ion conductivity of the sulfide-based inorganic solid electrolyte.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

The present application claims priority on the basis of JP2017-042635 filed on Mar. 7, 2017 in Japan, the content of which is incorporated herein by reference.

EXPLANATION OF REFERENCES

10: all-solid state secondary battery
1: negative electrode collector
2: negative electrode active material layer
3: solid electrolyte layer
4: positive electrode active material layer
5: positive electrode collector
6: operation portion

What is claimed is:
1. An all-solid state secondary battery comprising:
a positive electrode,
a negative electrode, and
a solid electrolyte layer between the positive electrode and the negative electrode, the solid electrolyte layer comprising a solid electrolyte film for an all-solid state secondary battery,
wherein the solid electrolyte film for an all-solid state secondary battery comprises:
an inorganic solid electrolyte material, comprising:
a sulfide-based inorganic solid electrolyte; and
an electron-insulating inorganic material that coats a surface of the sulfide-based inorganic solid electrolyte, is solid at 100° C., and thermally fuses in a temperature range of 200° C. or lower,
wherein the solid electrolyte film for an all-solid state secondary battery, further comprising:
an organic binder.
2. The all-solid state secondary battery according to claim 1, wherein the electron-insulating inorganic material is sulfur and/or modified sulfur.

* * * * *